(12) United States Patent
Barker et al.

(10) Patent No.: US 6,444,370 B2
(45) Date of Patent: Sep. 3, 2002

(54) ELECTROLYTES HAVING IMPROVED LOW TEMPERATURE PERFORMANCE

(75) Inventors: Jeremy Barker, Redmond, WA (US); Feng Gao, Henderson, NV (US); Arnold Stux, Baltimore, MD (US)

(73) Assignee: Valence Technology, Inc., Henderson, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,882

(22) Filed: Nov. 20, 1998

(51) Int. Cl.$^7$ ................................................. H01M 6/16
(52) U.S. Cl. ...................................................... 429/332
(58) Field of Search .......................... 252/62.2; 429/188, 429/324, 326, 332, 343

(56) References Cited

U.S. PATENT DOCUMENTS

| | | | |
|---|---|---|---|
| 5,192,629 A | 3/1993 | Guyomard et al. | 429/197 |
| 5,256,504 A | 10/1993 | Okuno et al. | 429/197 |
| 5,284,722 A | 2/1994 | Sugeno | |
| 5,352,548 A | 10/1994 | Fujimoto et al. | 429/197 |
| 5,474,862 A | 12/1995 | Okuno et al. | 429/197 |
| 5,484,669 A | 1/1996 | Okuno et al. | 429/194 |
| 5,521,027 A | 5/1996 | Okuno et al. | 429/194 |
| 5,525,443 A | 6/1996 | Okuno et al. | 429/194 |
| 5,712,059 A | 1/1998 | Barker et al. | 429/197 |
| 5,773,165 A * | 6/1998 | Sugeno | |
| 5,916,707 A * | 6/1999 | Omaru et al. | |
| 6,015,639 A * | 1/2000 | Gao et al. | |

FOREIGN PATENT DOCUMENTS

| | | |
|---|---|---|
| EP | 0531617 A1 | 3/1993 |
| EP | 0548449 A1 | 6/1993 |
| EP | 0766332 A1 | 4/1997 |
| EP | 0825664 A1 | 2/1998 |
| EP | 0892452 A2 | 1/1999 |
| JP | 8-195221 | 7/1996 |
| JP | 9-147910 | 6/1997 |
| JP | 9-097609 | 8/1997 |
| JP | 9-213366 | 8/1997 |
| JP | 11-031527 | 2/1999 |

OTHER PUBLICATIONS

M.C. Smart, "The Role of Electrolyte Upon the SEI Formation Characteristics and Low Temperature Performance of Lithium–Ion Cells with Graphite Anodes," Electrochemical Society Proceedings, vol. 98–16, 1999, pp. 441–447.

* cited by examiner

Primary Examiner—Carol Chaney
Assistant Examiner—Susy Tsang-Foster
(74) Attorney, Agent, or Firm—Harness, Dickey & Pierce, P.L.C.

(57) ABSTRACT

The present invention provides a novel electrolyte solvent which is usable with a variety of carbonaceous and metal oxide electrode active materials, providing improved performance over a broad temperature range, and which is stabilized to maintain cell capacity over a number of cycles.

3 Claims, 10 Drawing Sheets

ELECTROLYTES HAVING IMPROVED LOW TEMPERATURE PERFORMANCE

FIELD OF THE INVENTION

This invention relates to electrolytes which function as a source of alkali metal ions for providing ionic mobility and conductivity. The invention more particularly relates to electrolytic cells where such electrolytes function as an ionically conductive path between electrodes.

BACKGROUND OF THE INVENTION

Electrolytes are an essential member of an electrolytic cell or battery. In one arrangement, a battery or cell comprises an intermediate separator element containing an electrolyte solution through which lithium ions from a source electrode material move between cell electrodes during the charge/discharge cycles of the cell. The invention is particularly useful for making such cells in which the ion source electrode is a lithium compound or other material capable of intercalating lithium ions, and where an electrode separator membrane comprises a polymeric matrix made ionically conductive by the incorporation of an organic solution of a dissociable lithium salt which provides ionic mobility.

Early Lithium Metal Cells

Early rechargeable lithium cells utilized lithium metal electrodes as the ion source in conjunction with positive electrodes comprising compounds capable of intercalating the lithium ions within their structure during discharge of the cell. Such cells relied, for the most part, on separator structures or membranes which physically contained a measure of fluid electrolyte, usually in the form of a solution of a lithium compound, and which also provided a means for preventing destructive contact between the electrodes of the cell. Sheets or membranes ranging from glass fiber, filter paper or cloth to microporous polyolefin film or nonwoven organic or inorganic fabric have been saturated with solutions of an inorganic lithium compound, such as $LiClO_4$, $LIPF_6$, or $LiBF_4$, in an organic solvent to form such electrolyte/separator elements. The fluid electrolyte bridge thus established between the electrodes has effectively provided the necessary Li+ ion mobility at conductivities in the range of about $10^{-3}$ S/cm.

Ion, Rocking Chair Cells and Polymer Cells

Lithium metal anodes cause dendrite formation during charging cycles which eventually leads to internal cell short-circuiting. Some success has been achieved in combatting this problem through the use of lithium-ion cells in which both electrodes comprise intercalation materials, such as lithiated metal oxide and carbon (U.S. Pat. No. 5,196,279), thereby eliminating the lithium metal which promotes the deleterious dendrite growth. Another approach to controlling the dendrite problem has been the use of continuous films or bodies of polymeric materials which provide little or no continuous free path of low viscosity fluid in which the lithium dendrite may propagate. These materials may comprise polymers, e.g., poly (alkylene oxide), which are enhanced in ionic conductivity by the incorporation of a salt, typically a lithium salt such as $LiClO_4$, $LiPF_6$, or the like. A range of practical ionic conductivity, i.e., over about $10^{-5}$ to $10^{-3}$ S/cm, was only attainable with these polymer compositions at well above room temperature, however. (U.S. Pat. Nos. 5,009,970 and 5,041,346.)

"Solid" and "Liquid" Batteries of the Prior Art

More specifically, electrolytic cells containing an anode, a cathode, and a solid, solvent-containing electrolyte incorporating an inorganic ion salt were referred to as "solid batteries". (U.S. Pat. No. 5,411,820). These cells offer a number of advantages over electrolytic cells containing a liquid electrolyte (i.e., "liquid batteries") including improved safety factors. Despite their advantages, the manufacture of these solid batteries requires careful process control to minimize the formation of impurities. Solid batteries employ a solid electrolyte matrix interposed between a cathode and an anode. The inorganic matrix may be non-polymeric [e.g., β-alumina, silver oxide, lithium iodide, etc.] or polymeric [e.g., inorganic (polyphosphazene) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283.

Examples of solvents known in the art are propylene carbonate, ethylene carbonate, γ-butyrolactone, tetrahydrofuran, glyme (dimethoxyethane), diglyme, tetraglyme, dimethylsulfoxide, dioxolane, sulfolane, diethoxyethane, and the like. These are examples of aprotic, polar solvents.

More recently, a highly favored electrolyte/separator film is prepared from a copolymer of vinylidene fluoride and hexafluoropropylene. Methods for making such films for cell electrodes and electrolyte/separator layers are described in U.S. Pat. Nos. 5,418,091; 5,460,904; and 5,456,000 assigned to Bell Communications Research, each of which is incorporated herein by reference in its entirety. A flexible polymeric film useful as an interelectrode separator or electrolyte member in electrolytic devices, such as rechargeable batteries, comprises a copolymer of vinylidene fluoride with 2 to 25% hexafluoropropylene. The film may be cast or formed as a self-supporting layer retaining about 20% to 70% of a high-boiling solvent or solvent mixture comprising such solvents as ethylene carbonate or propylene carbonate. The film may be used in such form or after leaching of the retained solvent with a film-inert low-boiling solvent to provide a separator member into which a solution of electrolytic salt is subsequently imbibed to displace retained solvent or replace solvent previously leached from the polymeric matrix.

Electrolyte Performance

Regardless of which technique is used in preparing an electrolyte/separator, problems occur including operability of the electrolyte in a relatively narrow temperature range; loss of effectiveness of the electrolyte; and electrolyte degradation. There is presently no effective means to maintain the serviceability of the electrolyte over a broad temperature range, particularly low temperature.

In view of the above, it can be seen that it is desirable to have an improved electrolyte which is operable over a relatively broad temperature range, including low temperature, and which maintains cell capacity in a variety of electrolyte/separator configurations, including those described above as exemplary.

SUMMARY OF THE INVENTION

The present invention provides a novel electrolyte solvent which is usable with a variety of carbonaceous and metal oxide electrode active materials, providing improved performance over a broad temperature range, and which is stabilized to maintain cell capacity over a number of cycles. The electrolyte includes a specifically selected class of solvents, and solvent combinations using such new solvents.

The new solvents, when used as co-solvents, enhance the operable temperature range of the solvent mixture. The solvents of the invention are esters, generally characterized with lower melting points and higher boiling points compared to the range observed for commonly used solvents, such as dimethyl carbonate or diethyl carbonate. The novel, ester solvents of the invention have further lower melting points and higher boiling points than conventional solvents. The solvents are useful as both high and low temperature solvents but are particularly useful for low temperature applications such as start, light, ignition (SLI). The compounds usable as solvents according to the invention are compounds represented by the general formula R' COOR" (alkyl aliphatic ester) where R' and R" are each independently selected from the group consisting of ethyl and propyl.

In one embodiment, the ester represented by the general formula is included in a solvent mixture which also comprises ethylene carbonate (EC) and propylene carbonate (PC). In one embodiment, the combined amount of the EC and PC is greater, on a weight basis, than the amount of the ester of the formula stated above.

In another embodiment, the solvent mixture further comprises one or more other organic solvents along with the ester, and with the EC and/or PC ester mixture. When such other additional organic solvent or solvents is included in the mixture, it is preferred that such solvent be selected from the group of carbonates; lactones; propionates; five member hetercyclic ring compounds; and organic solvent compounds having a low alkyl (1–4 carbon) group connected through an oxygen to a carbon, and comprising C/O/C bonds.

One preferred solvent mixture comprises EC, or EC and PC; DMC; and the ester compound R' COOR" of the invention. A preferred combination is EC/DMC/R' COOR" or EC/DMC/EP/PC in weight ratios as follows: EC/DMC/EP at about 25:40:35 and at about 3:5:2 and EC/DMC/EP/PC at about 58:29:12:1.

Advantageously, the solvent ester of the invention is usable with a variety of cell electrode active materials including lithium, transition metal oxide compounds such as $LiMn_2O_4$, $LiNiO_2$, $LiCoO_2$, $LiNiVO_4$, and $LiCoNiO_2$. It is most preferred that the electrode active material be lithium manganese oxide represented by the nominal general formula. $Li_{1+x}Mn_{2-x}O_4$ ($-0.2 \leq x \leq 0.2$)

Advantageously, the ester solvent of the invention is usable with graphite active material consisting of particles which have an interlayer distance spacing of 002 planes as determined by X-ray diffraction of 0.33 to 0.34 nanometers; a crystallite size in the direction of C-axis ($L_c$) being greater than about 20 nanometers and less than about 2000 nanometers; and at least 90% by weight of the graphite particles having a size less than about 60 microns. It is most preferred that the graphite particles have a BET surface area greater than about 0.3 meters square per gram and up to about 35 meters square per gram.

In the case where one or more additional organic solvents is used in a solvent mixture along with the ester, the added solvents are preferably organic solvents having a boiling point of about 80° C. to about 300° C. and are capable of forming a solute with lithium salts. Preferably the added solvents are also characterized by being aprotic, polar solvents. Preferred additional organic solvents are ethylene carbonate (EC), dimethyl carbonate (DMC), propylene carbonate (PC). The relative amounts of the added solvents and the ester compound may vary so long as the ester of the invention is present. One particularly useful combination is a solvent mixture comprising EC/PC/DMC/R' COOR", where R' and R" are each independently selected from the group consisting of ethyl and propyl. Except for the present invention, there is not known to be the use of solvent combinations comprising EC/PC/R' COOR".

Advantageously, the solvent of the present invention exhibits good performance even with carbonaceous electrode active materials and with transition metal active electrode materials. These materials are known to show poor performance when used with more conventional organic solvents.

Objects, features and advantages of the invention include an improved electrochemical cell or battery having good charging and discharging characteristics; a large discharge capacity; good integrity over a long life cycle; and operability over a large temperature range and particularly relatively low temperature; and which is stable with respect to carbonaceous and graphitic electrode active material and stable with respect to metal oxide electrode material.

These and other objects, features, and advantages will become apparent from the following description of the preferred embodiments, claims, and accompanying drawings.

BRIEF DESCRIPTION OF THE DRAWINGS

FIG. 7A shows the testing of a cell having a lithium manganese oxide cathode and an anode electrode active material designated as KX44 which is graphitic carbon fibers. The cell has an electrolyte which comprises one molar $LiPF_6$ in a solution of EC\DMC\EC\PC in a weight ratio of 58:29:12:1. The cell charge and discharge are at +/−2 milliamp hours per centimeters square, between 3.0 and 4.2 volts for one to ten cycles. The negative electrode contained 667 milligrams of the KX44 active material and the positive electrode contained 2000 milligrams of the lithium manganese oxide active material. The surface area of each of the electrodes was 48 square centimeters. FIG. 7A is coulombic efficiency and FIG. 7B is discharge capacity, each versus cycles.

In FIG. 8 the comparative cell was cycled at 10 milliamp hours per square centimeter and at temperatures of 20° C. down to −10° C. The cycling data is not shown for −10° C. because the cell failed.

DESCRIPTION OF THE PREFERRED EMBODIMENTS

Figure 1:
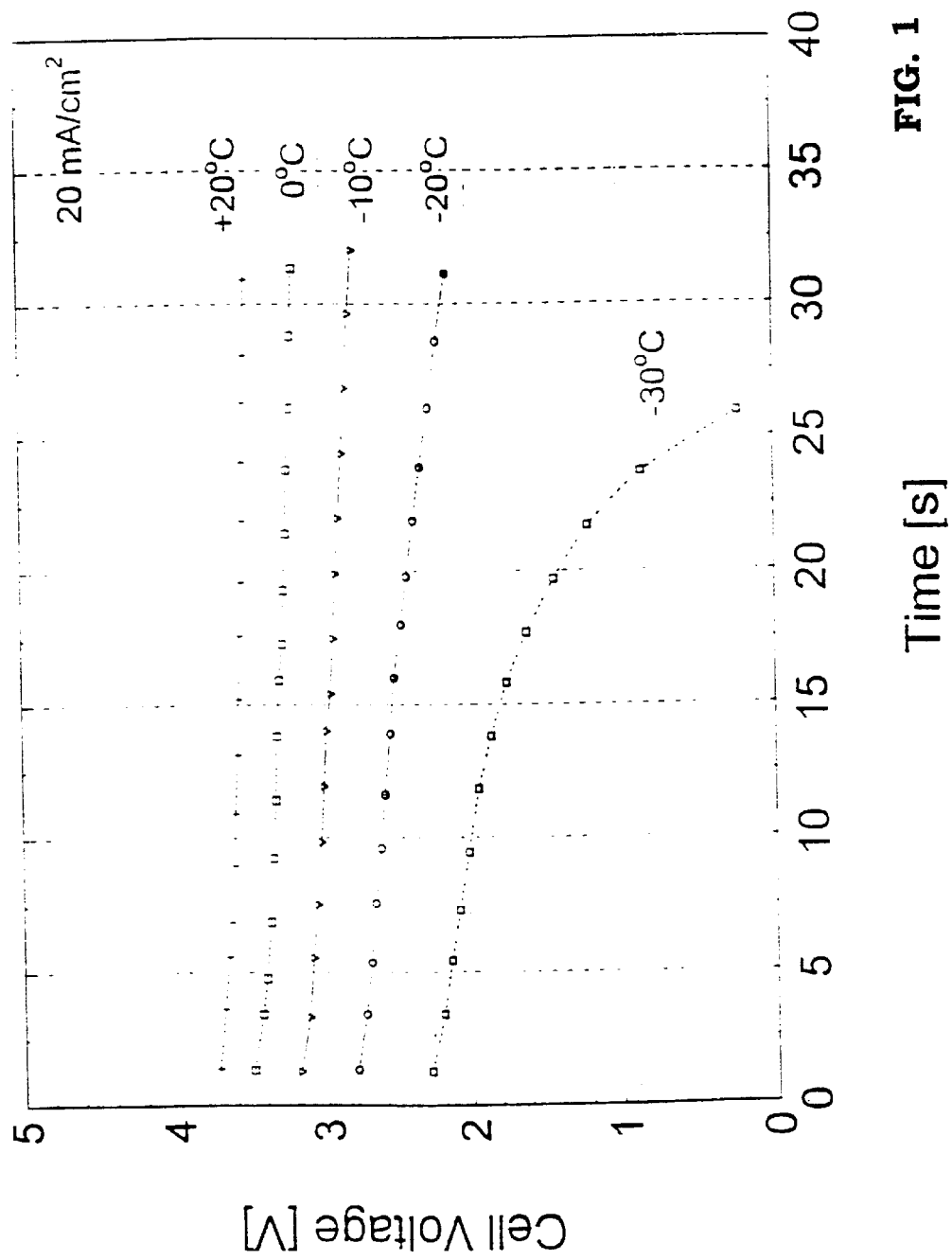
FIG. 1 is a graph showing the results of pulse discharge testing of a cell having 1480 milligrams lithium manganese oxide (LMO) cathode active material, 493 milligrams BG-35 carbon graphite anode active material, and electrolyte comprising one molar $LiPF_6$ in a solution of EC\DMC\EP in a solvent volume ratio of 1:2:2, corresponding to a weight ratio of about 25:40:35. The test was conducted at 20 milliamps per square centimeter for temperatures ranging from +20° C. to –30° C.

In the present state of the art, the use of graphite as a negative electrode material presents a problem when used with a propylene carbonate electrolyte solvent. Cells containing graphite and propylene carbonate and other similar electrolytes suffer from very poor reversible capability during delithiation (deintercalation). In addition, electrolyte decomposition occurs and significant gas is released, posing a safety risk. The electrolyte decomposition is thought to be because graphite has many active sites in its structure.

It has been found that if a graphite negative electrode is used in an electrolyte containing propylene carbonate as the solvent, the solvent is apparently absorbed into the active sites of the graphite negative electrode and readily generates gas through decomposition. As a result, the decomposition of the solvent prevents lithium ion as an active material from intercalating into the graphite on charging the battery and causes an increase in polarization; consequently, the battery capacity is decreased. In other words, it is thought that graphite is catalytic and causes breakdown of propylene carbonate. Such decomposition of the propylene carbonate results in the evolution of the gas, probably propylene.

In view of the difficulties mentioned above, propylene carbonate is usable only with non-graphitic anodes and is not usable with crystalline, ordered planar structure graphitic anodes. It has recently been suggested to use dimethyl carbonate (DMC) in combination with ethylene carbonate (EC) for any type of carbonaceous anode. See for example, U.S. Pat. Nos. 5,352,548 and 5,192,629, each of which is incorporated by reference in its entirety. However, such electrolyte is undesirable since the DMC readily evaporates leaving behind the EC which quickly solidifies, rendering the cell useless. In U.S. Pat. No. 5,474,862, Okuno et al restrict the use of ethylene carbonate to graphite active material. In Okuno '862, PC is not recommended for graphite. Ethylene carbonate and propylene carbonate are never used together according to Okuno. Okuno states that PC may only be used in combination with amorphous carbon or with metallic lithium.

In one embodiment, the electrolyte of the invention comprises a solvent mixture containing the novel solvent esters of the invention and useable with EC and PC together. Such solvent esters have lower melting points and higher boiling points compared to the range observed for commonly used solvents, such as dimethyl carbonate (DMC). The DMC does not have a high boiling point and is not suitable for high temperature operation. It is not suitable for low temperature operation due to its high melting point. The esters of the invention have further lower melting point and higher boiling point useful as both high and low temperature solvents. Therefore, the advantages of temperature spread between the melting point and the boiling point is achieved by the esters of the invention by employing a preferred compound of the formula R' COOR" for R' and R" are each independently selected from the group consisting of ethyl and propyl. The preferred solvents are ethyl propionate, ethyl butyrate, propyl propionate and propyl butyrate. The physical characteristics of these solvents are shown in Table I.

The ester compound of the invention is preferably used in a solvent mixture. Such solvent mixture preferably includes one or more other organic solvents. Such solvent mixture preferably includes one or more other organic solvents having a boiling point of about 80° C. to about 300° C. and where such other solvent is capable of forming a solute with lithium salts.

Even a small amount of the ester compound solvents of the invention is helpful to the mixture, therefore, the lower limit is greater than zero. A practical range by weight is up to 85% ester compound solvent to other organic solvents in the mixture. The ester is effective in electrolyte solutions comprising a solute consisting essentially of a salt of lithium, and a solvent consisting essentially of one or more apractic, polar solvent compounds in combination with the ester.

Preferably, the aprotic polar solvent is selected from the group consisting of carbonates, lactones, propionates, five member ring compounds, and organic solvent compounds having a low alkyl group (1–4 carbons) connected through an oxygen to a carbon and comprising C—O—C bonds.

It is preferred that the aprotic, polar solvent is a carbonate selected from the group consisting of propylene carbonate (PC), ethylene carbonate (EC), methyl ethyl carbonate (MEC), diethyl carbonate (DEC), dipropyl carbonate (DPC), dimethyl carbonate (DMC), butylene carbonate (BC), dibutyl carbonate (DBC), vinylene carbonate (VC), and mixtures thereof. (Table II). Note that methyl ethyl carbonate (MEC) and ethyl methyl carbonate (EMC) are used interchangeably. The physical characteristics of these solvents are shown in Table II.

A battery or cell which utilizes the novel family of salts of the invention will now be described. Note that the preferred cell arrangement described here is illustrative and the invention is not limited thereby. Experiments based on full and half cell arrangements were conducted as per the following description.

Polymeric electrolytic cells comprise polymeric film composition electrodes and separator membranes. In particular, rechargeable lithium battery cells comprise an intermediate separator element containing an electrolyte solution through which lithium ions from a source electrode material move between cell electrodes during the charge/discharge cycles of the cell. In such cells an ion source electrode is a lithium compound or other material capable of intercalating lithium ions. An electrode separator membrane comprises a polymeric matrix made ionically conductive by the incorporation of an organic solution of a dissociable lithium salt which provides ionic mobility. Strong, flexible polymeric electrolytic cell separator membrane materials retain electrolyte lithium salt solutions and remain functional over temperatures ranging well below room temperature. These electrolyte membranes are used either in the usual manner as separator elements with mechanically assembled battery cell components, or in composite battery cells constructed of successively coated layers of electrode and electrolyte compositions.

Performance data for the preferred solvent mixtures of the invention are shown in FIGS. 1–8, as a result of testing in actual cells. Before further describing the invention, the construction of a typical ion cell will now be described with reference to FIGS. 9 and 10.

Figure 9:
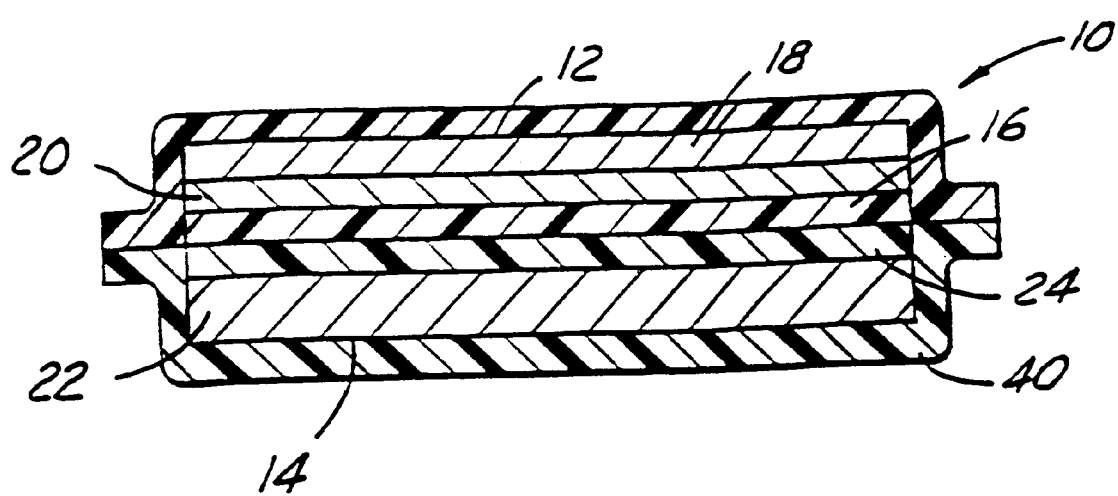
FIG. 9 is a diagrammic representation of a typical laminated lithium-ion battery cell structure which is prepared with the electrolyte salt of the present invention.

A typical laminated battery cell structure 10 is depicted in FIG. 9. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

Figure 10:
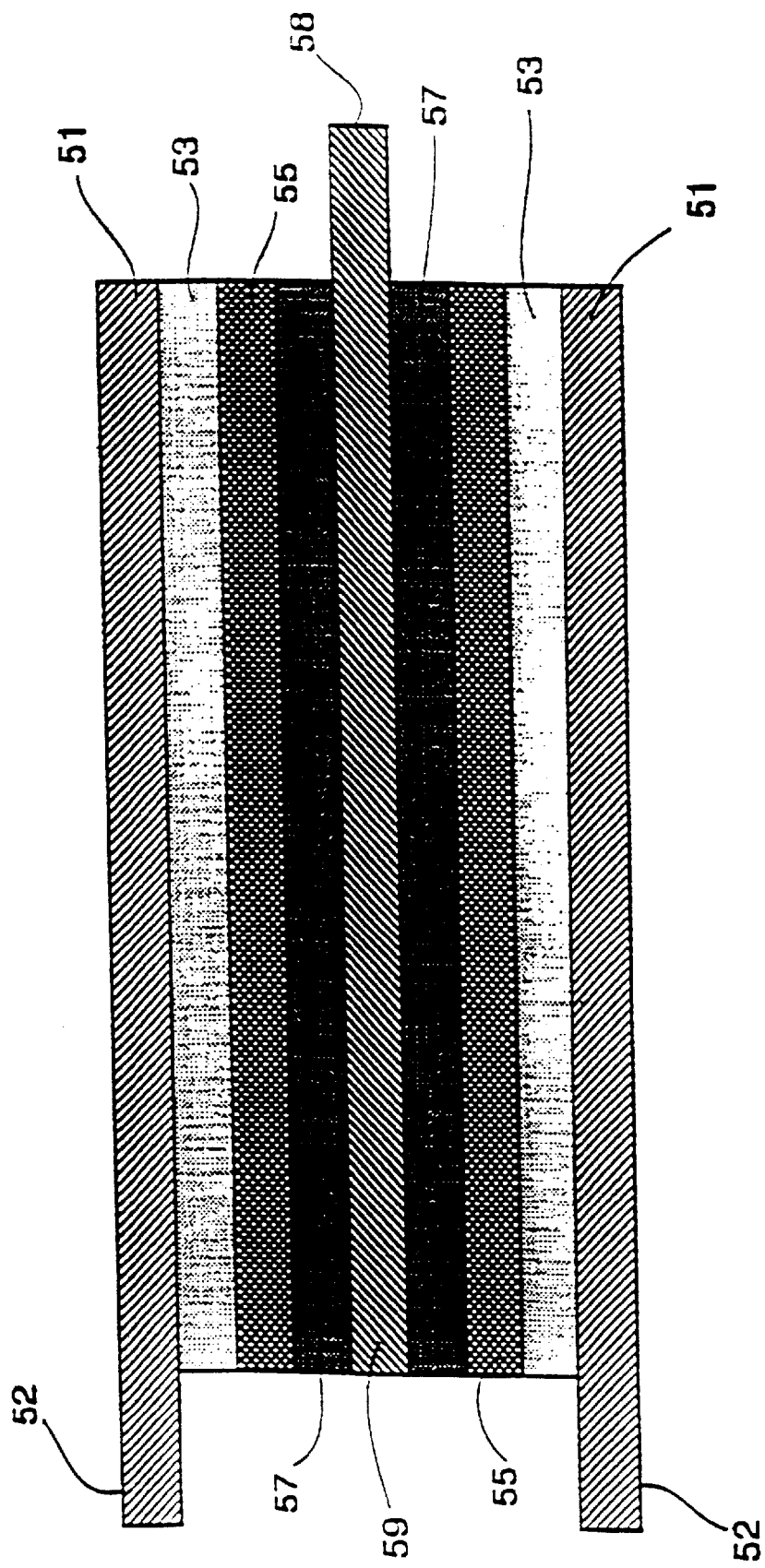
FIG. 10 is a diagrammic representation of a multicell battery cell structure which is prepared with the electrolyte salt of the present invention.

In another embodiment, a multicell battery configuration as per FIG. 10 is prepared with copper current collector 51, negative electrode 53, electrolyte/separator 55, positive electrode 57, and aluminum current collector 59. Tabs 52 and 58 of the current collector elements form respective terminals for the battery structure.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–85 weight percent. The negative electrode comprises about 50–95% by weight of a preferred graphite, with the balance constituted by the binder. A typical electrolyte separator film comprises approximately two parts polymer for every one part of a preferred fumed silica. Before removal of the plasticizer, the separator film comprises about 20–70% by weight of the composition; the balance constituted by the polymer and fumed silica in the aforesaid relative weight proportion. The conductive solvent comprises the solvent of the invention and suitable salts. Desirable salts and solvent/salt ratios are described in U.S. Pat. Nos. 5,712,059 and 5,418,091. One example is a mixture in a weight ratio of about 90 parts or more of solvent to 10 parts or less of salt. Therefore, the range of salt content may be very broad.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as casting solvents, for example, carbonates. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

In the construction of a lithium-ion battery, a current collector layer of aluminum foil or grid is overlaid with a positive electrode film, or membrane, separately prepared as a coated layer of a dispersion of intercalation electrode composition. This is typically an intercalation compound such as $LiMn_2O_4$ (LMO), $LiCoO_2$, or $LiNiO_2$, powder in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, intercalation electrodes, solid electrolytes and liquid electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VDF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

As described earlier, the electrochemical cell which utilizes the novel solvent of the invention may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. When forming cells for use as batteries, it is preferred to use an intercalation metal oxide positive electrode and a graphitic carbon negative electrode. Various methods for fabricating electrochemical cells and batteries and for forming electrode components are described herein. The invention is not, however, limited by any particular fabrication method as the novelty lies in the unique electrolyte.

EXAMPLE I

A graphite electrode was fabricated by solvent casting a slurry of BG-35 graphite, binder, plasticizer, and casting solvent. The graphite, BG-35, was supplied by Superior Graphite, Chicago, Ill. The BG series is a high purity graphite derived from a flaked natural graphite purified by heat treatment process. The physical features are given in Table III. The binder was a copolymer of polyvinylidene difluoride (PVDF) and hexafluoropropylene (HFP) in a wt. ratio of PVDF to HFP of 88:12. This binder is sold under the designation of Kynar Flex 2801®, showing it's a registered trademark. Kynar Flex is available from Atochem Corporation. An electronic grade solvent was used. The slurry was cast onto glass and a free standing electrode was formed as the casting solvent evaporated. The electrode composition was approximately as follows on a dry weight % basis: 60% graphite; 16% binder; 21% plasticizer and 2% conductive carbon.

An electrode cathode was also fabricated by solvent casting a slurry of lithium manganese oxide (LMO), conductive carbon, binder, plasticizer, and solvent. The lithium manganese oxide used was $LiMn_2O_4$ supplied by Kerr-McGee (Soda Springs, Id.); the conductive carbon used was Super P (MMM carbon), Kynar Flex 2801® was used as the binder along with a plasticizer, and electronic grade acetone was used as the solvent. The slurry was cast onto aluminum foil coated with polyacrylic acid/conductive carbon mixture. The slurry was cast onto glass and a free standing electrode was formed as the solvent was evaporated. The cathode electrode composition was approximately as follows on a dry weight % basis: 65% $LiMn_2O_4$; 5.5% graphite, 10% binder; and 19.5% plasticizer.

A rocking chair battery was prepared comprising a graphite anode, an intercalation compound cathode, and a novel electrolyte additive of the invention. The negative electrode comprising BG-35 was prepared as described above. The lithium manganese oxide positive electrode was also prepared in accordance with the above description. The active mass of the negative electrode was 493 milligrams and the active mass of the positive electrode was 1480 milligrams. A first electrolyte solution of 1 molar $LiPF_6$ in a solvent of EC/DMC/EP (1:2:2 by volume and about 25:40:35 by weight) was prepared. The two electrode layers were arranged with an electrolyte layer in between, and the layers were laminated together using heat and pressure as per the Bell Comm. Res. patents incorporated herein by reference earlier. The results of pulse charge type testing of this cell are shown in FIG. 1.

EXAMPLE II

Figure 2:
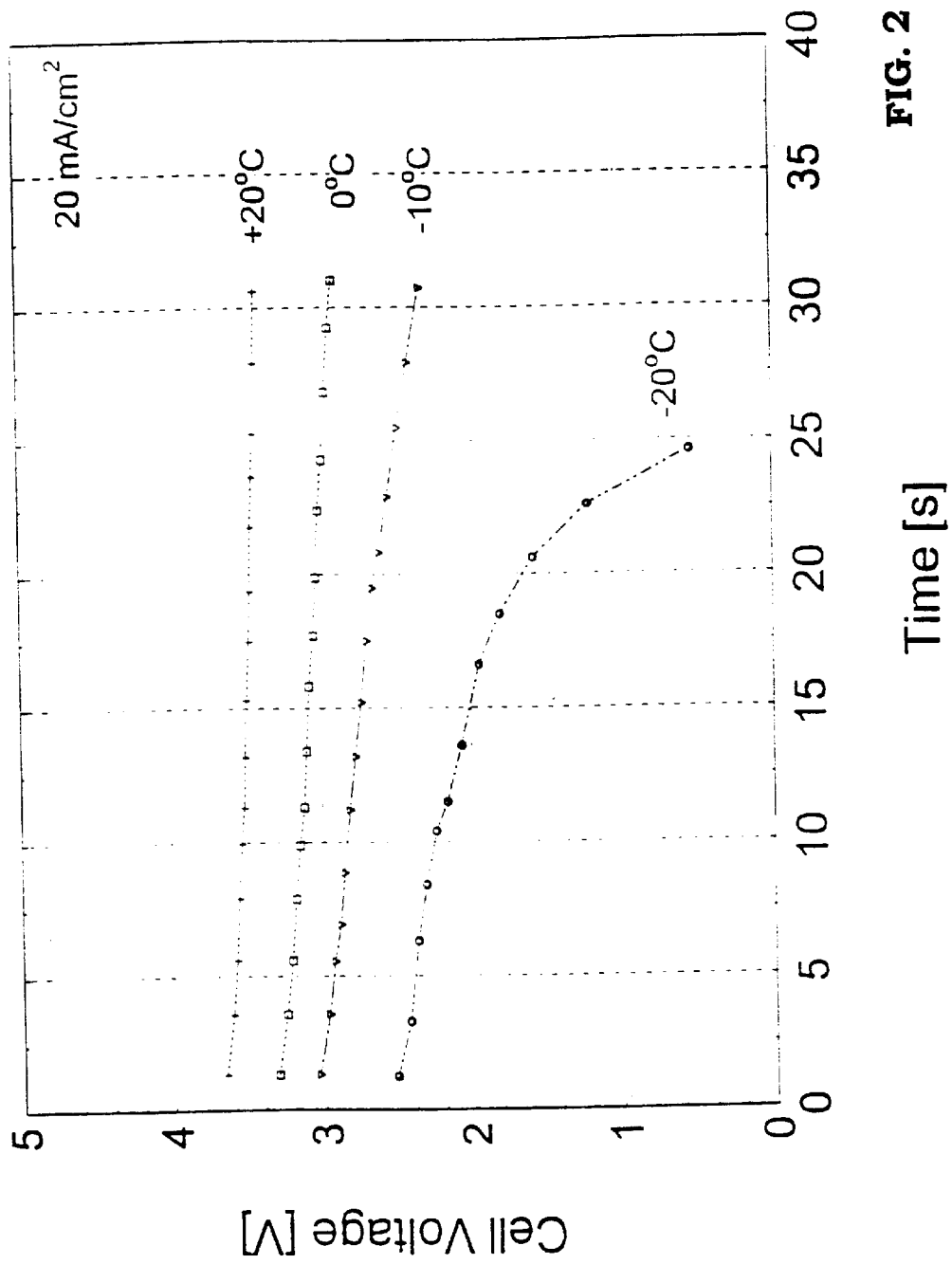
FIG. 2 is a graph showing the results of pulse discharge testing of a cell having lithium manganese oxide cathode, BG-35 carbon graphite anode, and electrolyte comprising one molar $LiPF_6$ in a solution of EC\EMC\EP in a solvent volume ratio of 1:2:2, corresponding to a weight ratio of about 25:40:35. The test was conducted at 20 milliamps per square centimeter for temperatures ranging from +20° C. to –20° C.

Another cell was prepared in accordance with the method of Example I, except that the electrolyte was 1 molar $LiPF_6$ in a solvent of EC/EMC/EP (volume ratio of 1:2:2 and about 25:40:35 by weight). The results of testing are shown in FIG. 2.

EXAMPLE III

Figure 3:
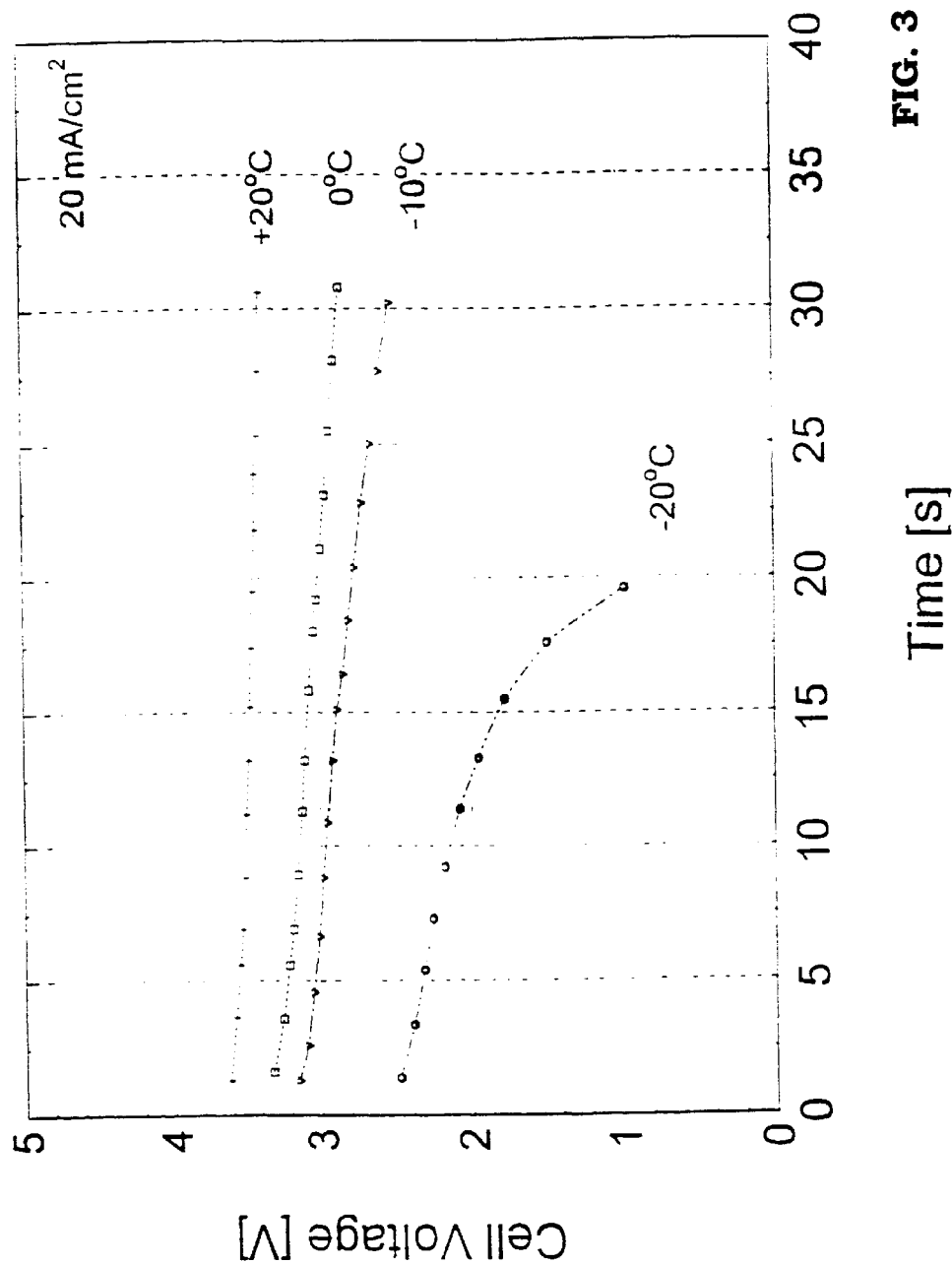
FIG. 3 is a graph showing the results of pulse discharge testing of a cell having lithium manganese oxide cathode, BG-35 carbon graphite anode, and electrolyte comprising one molar $LiPF_6$ in a solution of EC\EMC\EP in a solvent weight ratio of 3:5:2. The test was conducted at 20 milliamps per square centimeter for temperatures ranging from +20° C. to –20° C.

An additional cell was prepared in accordance with the method of Example I, except that the electrolyte was 1 molar $LiPF_6$ in a solvent of EC/EMC/EP in a weight ratio of 3:5:2. The results of testing are shown in FIG. 3.

EXAMPLE IV

Figure 4:
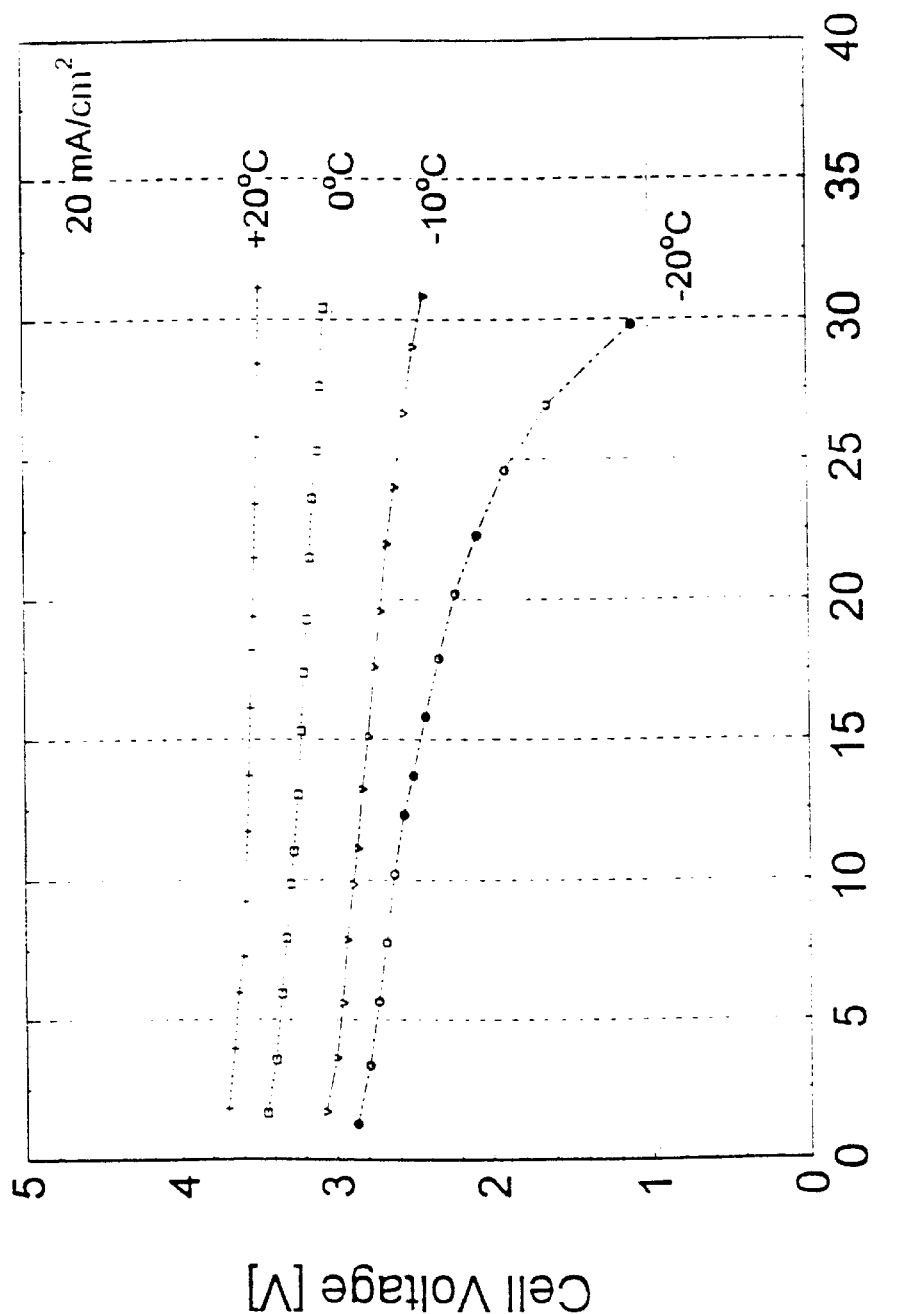
FIG. 4 is a graph showing the results of pulse discharge testing of a cell having lithium manganese oxide cathode, BG-35 carbon graphite anode, and electrolyte comprising one molar $LiPF_6$ in a solution of EC\DMC\EP in a solvent weight ratio of 3:5:2. The test was conducted at 20 milliamps per square centimeter for temperatures ranging from +20° C. to –20° C.

A cell was prepared in accordance with the methods of Example I, except that the electrolyte solution comprised 1 molar $LiPF_6$ in a solvent of EC/DMC/EP in a weight ratio of 3:5:2. The results of testing are shown in FIG. 4.

Figure 5:
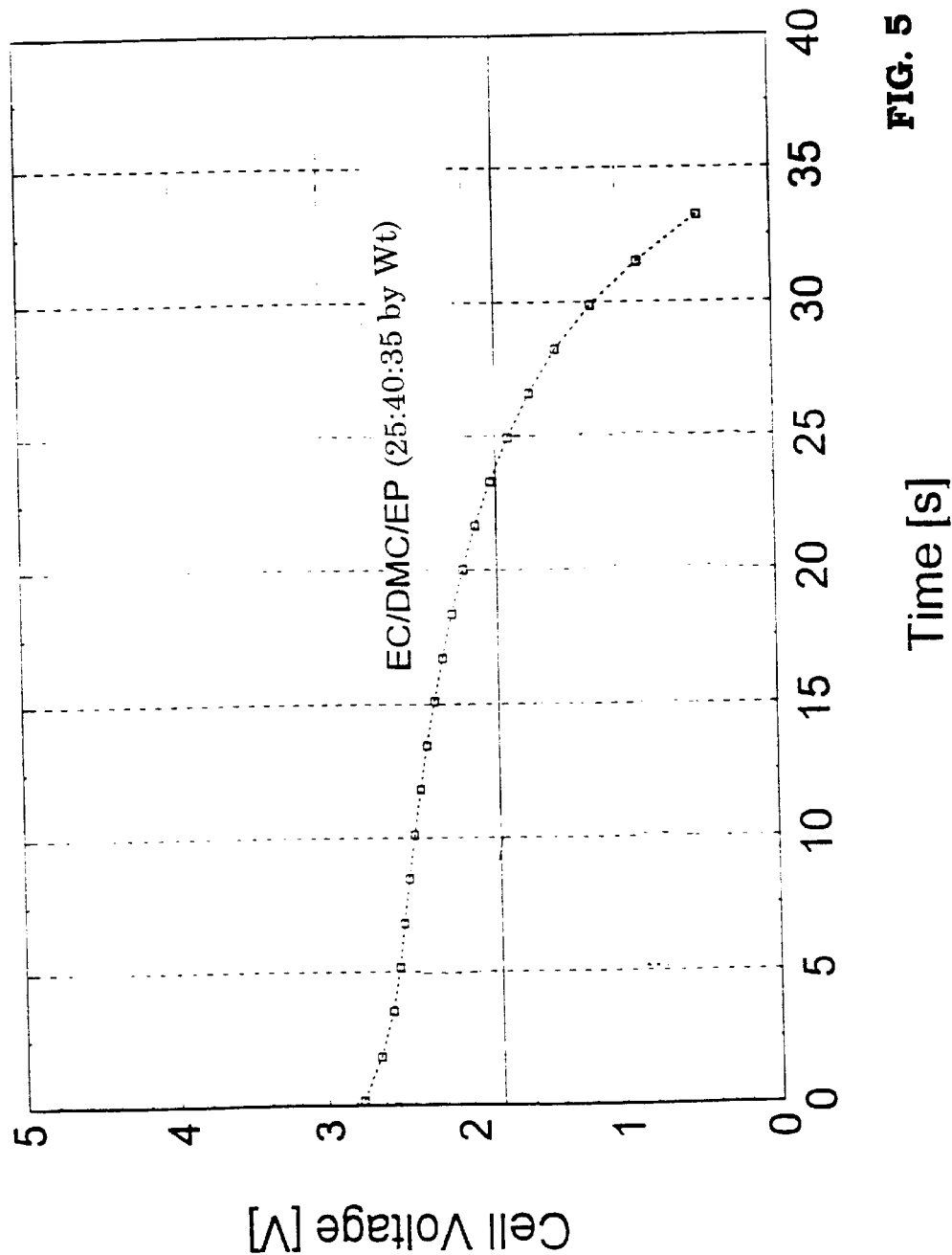
FIG. 5 shows start, light, ignition (SLI) test data for the cell described as per FIG. 1 and where the conditions of the test are 25 milliamps per square centimeter at –18° C.
Figure 6:
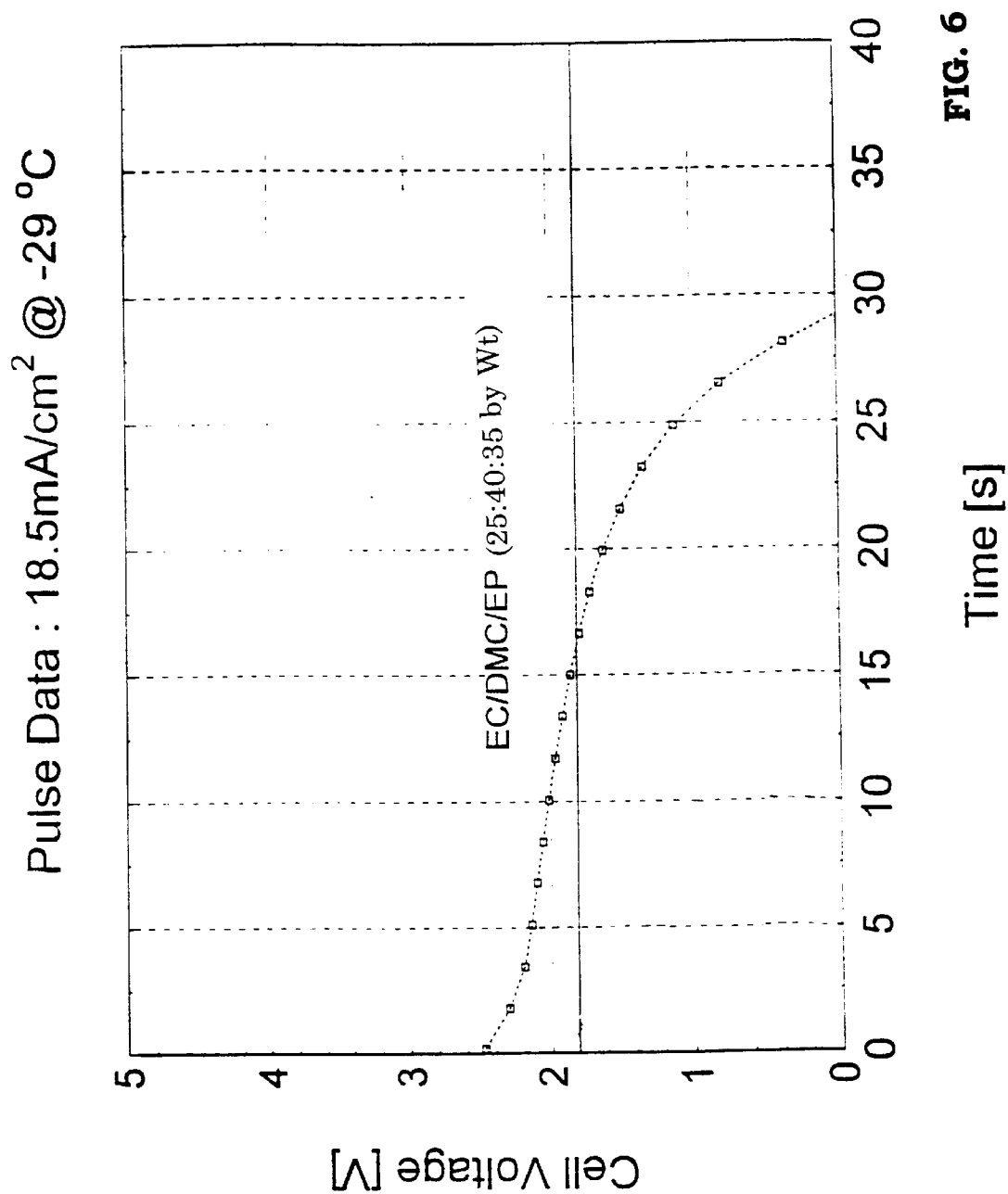
FIG. 6 shows start, light ignition (SLI) test data for the same cell described with respect to FIG. 1, and undergoing testing at 18.5 milliamps per square centimeter and a temperature of –29° C.

FIGS. 5 and 6 are for SLI pulse data at 25 $mA/cm^2$ for 30 seconds at $-18°$ C. and 19 $mA/cm^2$ for 30 seconds at $-29°$ C. The cell tested was the same as described for Example I, having BG35/LMO and 1 molar $LiPF_6$ in electrolyte of EC/DMC/EP at volume ratio of 1:2:2.

FIGS. 1–6 summarize the pulse data for the experimental electrolytes of Examples I–IV. The pulse discharge tests are conducted at selected temperatures for a period of time. The time is selected to represent a desired operating condition, for example, starting a car. The time limit normally is 30 seconds. The voltage limit is above 1.8 volts; and the current changes with temperature of test being conducted. The best performance combines the aspects of high current discharge at low temperature with the highest voltage for over 30 seconds. The initial pulse data were collected at 20 $mA/cm^2$ for 30 seconds (FIGS. 1–4). Two iterations were then monitored for the EC/DMC/EP at 1:2:2 measured at target current densities at $-18°$ C. and $-29°$ C. as per FIGS. 5 and 6. The 1.8 volt cut-off is shown in FIGS. 5 and 6. The best low temperature performance was demonstrated by the EC/DMC/EP at 1:2:2 volume ratio. This electrolyte is suitable for applications where improved high and low temperature performance are both required.

EXAMPLE V

Another cell was prepared in accordance with the methods of Example I, except that the negative electrode active material was a carbon material designated as KX44. This carbon electrode active material is graphitic in nature and is in the form of graphitic carbon fibers having a filament diameter in the range of 4–20 microns and typically on the order of 9 microns. These carbon fibers are sold by PETOCA, Ltd. and are designated melblon fibers, which are carbon fibers suitable for industrial use. These carbon fibers have high strength due to their formation from petroleum pitch (mesophase pitch) as the starting material. The physical features of the KX44 carbon fibers are given in Table IV. The electrolyte of this example was 1 molar $LiPF_6$ salt in a solvent mixture of EC/DMC/EP/PC at a weight ratio of 58:29:12:1.

Figure 7:
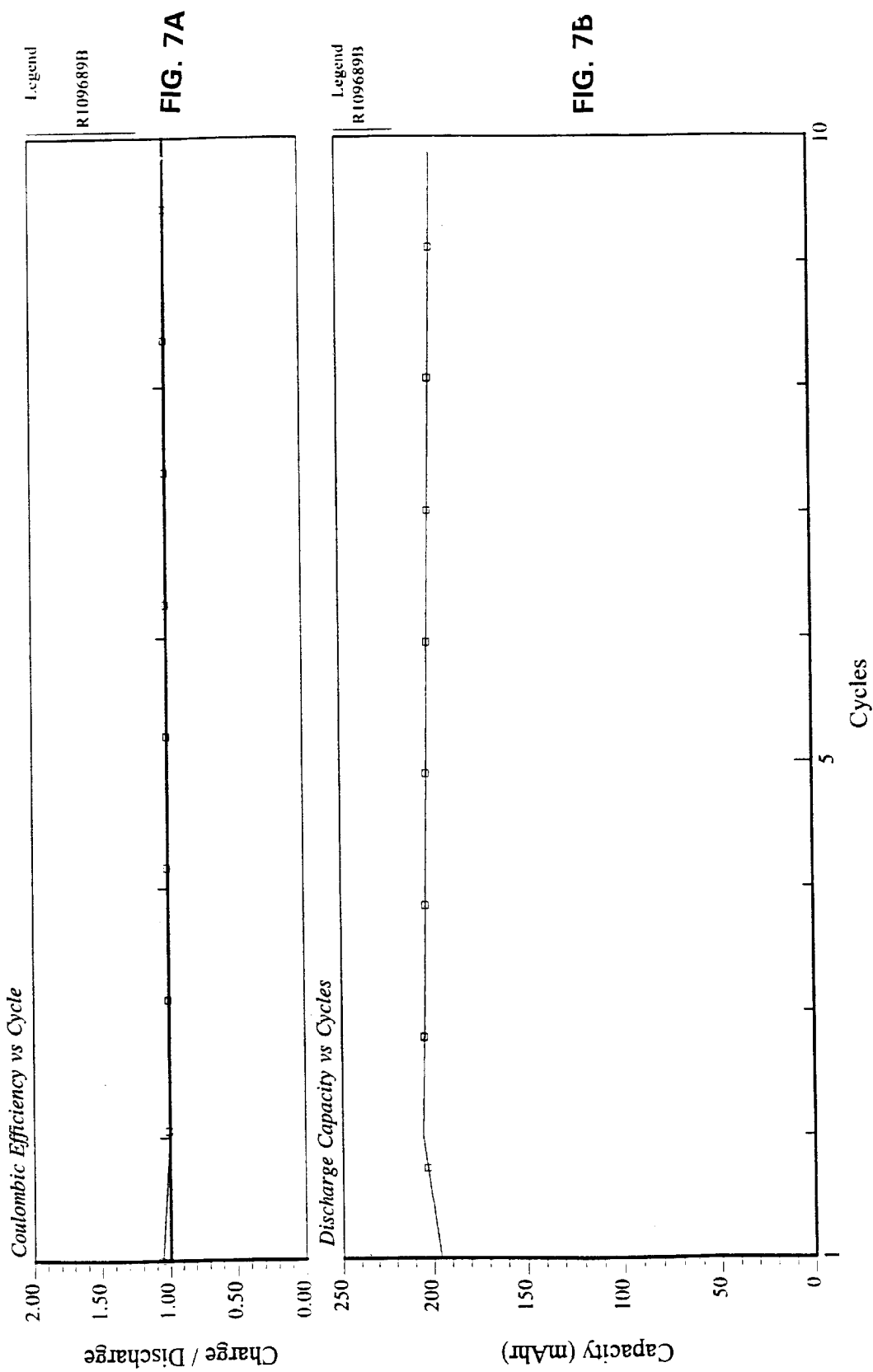
FIG. 7 is a two part graph.

FIG. 7 is a two-part graph. FIG. 7A shows the excellent rechargeability and FIG. 7B shows the excellent cyclability and capacity of the cell prepared in accordance with Example V. The capacity was determined at constant current cycling for cycles 1 to 10 consistent with the test parameters described above. FIG. 7 shows long cycle life demonstrated by the relatively slow capacity fade with cycle numbers. The recharge ratio data shows the absence of any appreciable side reactions and decompositions over the extended life cycling. This can be more particularly seen from FIG. 7A. The recharge ratio maintains its value exceptionally close to 1. The cell maintains close to 100 percent of its capacity over extended cycling to 10 cycles. The combination of slow, minimal capacity fade along with excellent recharge ratio demonstrates the absence of any appreciable side reactions. The cell of FIG. 7 containing 1 M $LiPF_6$ EC/DMC/EC/PC at weight ratio of 58:29:12:1 cycled well with low capacity fade and indicated good compatibility of the solvent in the graphite/LMO system.

Comparative Example

For comparison purposes, an additional cell was prepared in accordance with the methods of Example I, except that the solvent only contained EC/DMC. The solvent was 1 molar $LiPF_6$ in 2:1 EC/DMC. This electrolyte was also used in a cell having an LMO lithium manganese oxide positive electrode and a BG-35 negative counter-electrode. The active mass of the positive electrode was 1480 milligrams and the negative electrode was 493 milligrams.

Figure 8:
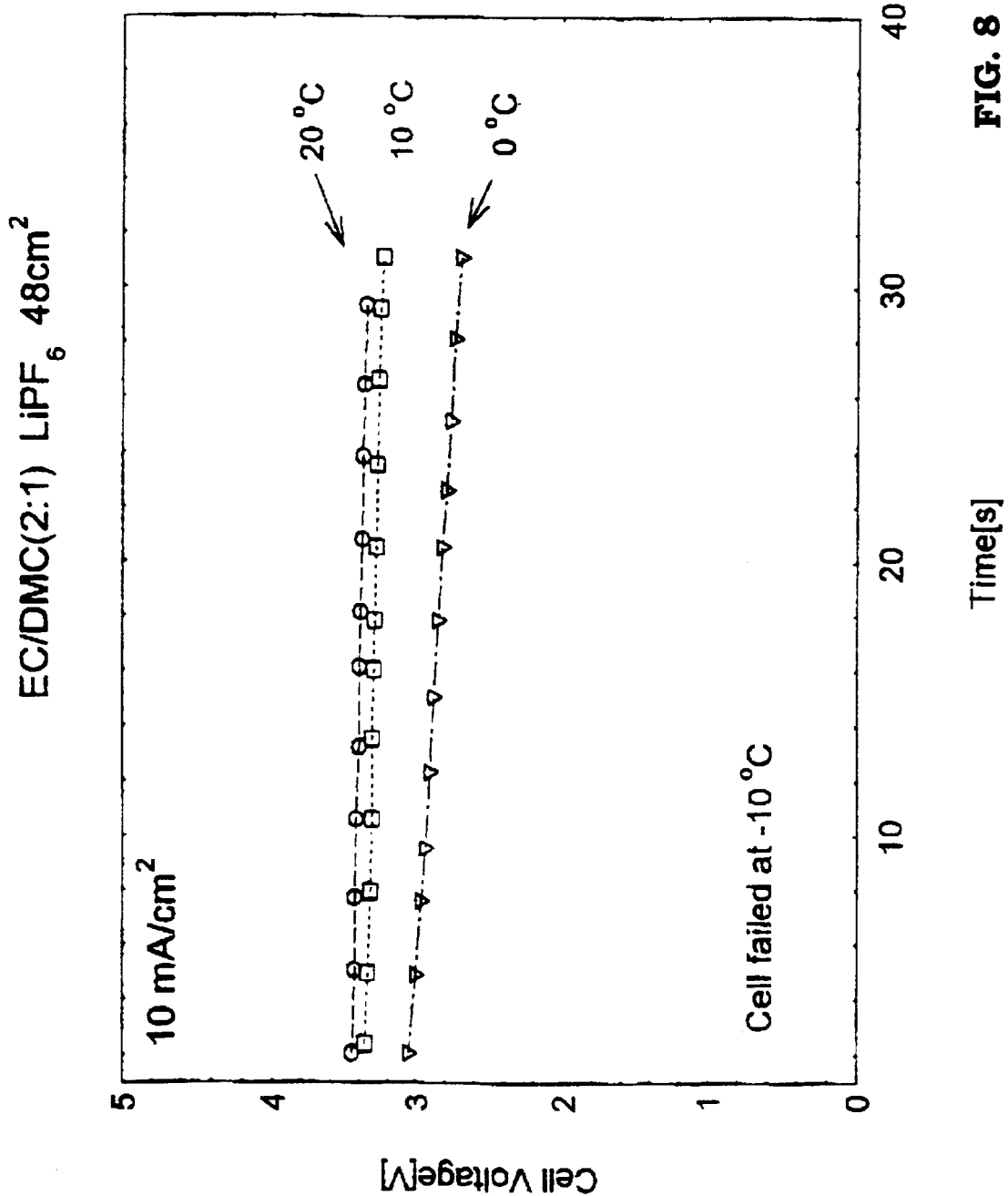
FIG. 8 is a graph showing the results of testing a comparative cell with a solvent which contains only EC/DMC, without any R'COOR" of the invention. In this graph, the electrolyte was one molar $LiPF_6$ and 2:1 EC/DMC solvent. This electrolyte was used in a cell having lithium manganese oxide (LMO) positive electrode and a BG/35 negative electrode. The active mass of the positive electrode was 1480 milligrams and the active mass of the negative electrode was 493 milligrams.

FIG. 8 contains the results of cycling the comparative cell at 10 $mA/cm^2$. This cell did not perform as well as the EC/DMC/EP solvent based cell of the earlier Examples. This cell failed at −10° C. At 0° C., 10° C. and 20° C., this cell showed poor performance relative to the earlier examples.

TABLE I

Ester (R'COOR'') Solvent Properties

|  | EP | EB | PP | PB |
|---|---|---|---|---|
| Molecular Weight (g/mol) | 102.13 | 116.16 | 116.16 | 130.19 |
| Boiling Point (° C.) | 99 | 120 | 122 | 142 |
| Melting Point (° C.) | −73 | −93 | −76 | — |
| Density (g/cm$^3$) | 0.891 | 0.878 | 0.881 | 0.873 |
| Solution Conductivity (S/cm) | <10$^{-7}$ | <10$^{-7}$ | <10$^{-7}$ | <10$^{-7}$ |
| Viscosity (cp at 25° C.) | — | — | — | — |
| Dielectric Constant | — | — | — | — |
| Water Content (ppm) | <30 | <30 | <30 | <30 |
| Electrolytic Conductivity at 23° C. 1M $LiPF_6$ | 6.3 | — | — | — |

Note:
1) EP = ethyl propionate $C_2H_5COOC_2H_5$
2) EB = ethyl Butyrate $C_3H_7COOC_2H_5$
3) PP = propyl propionate $C_2H_5COOC_3H_7$
4) PB = propyl butyrate $C_3H_7COOC_3H_7$

TABLE II

Characteristics of Organic Solvents

|  | PC | VC | EC | DMC |
|---|---|---|---|---|
| Boiling Temperature (C.) | 240 | 162 | 248 | 91.0 |
| Melting Temperature (C.) | −49 | 22 | 39–40 | 4.6 |
| Density (g/cm$^3$) | 1.198 | 1.35 | 1.322 | 1.071 |
| Solution Conductivity (S/cm) | 2.1 × 10$^{-9}$ | — | <10$^{-7}$ | <10$^{-7}$ |
| Viscosity (cp) at 25° C. | 2.5 | — | 1.86 (at 40° C.) | 0.59 |
| Dielectric Constant | 64.4 | — | 89.6 | 3.12 |
| at 20° C. | | | | (at 40° C.) |
| Molecular Weight | 102.0 | 86.047 | 88.1 | 90.08 |
| H$_2$O Content | <10 ppm | — | <10 ppm | <10 ppm |
| Electrolytic Conductivity (mS/cm) 20° C. 1M LiAsF$_6$ | 5.28 | — | 6.97 | 11.00 (1.9 mol) |

TABLE II Continued

|  | DEC | BC | MEC | DPC |
|---|---|---|---|---|
| Boiling Temperature (C.) | 126 | 230 | 107 | 167–168 |
| Melting Temperature (C.) | −43 | — | −55 | — |
| Density (g/cm$^3$) | 0.98 | 1.139 | 1.007 | 0.944 |
| Solution Conductivity (S/cm) | <10$^{-7}$ | <10 − 7 | 6 × 10$^{-9}$ | <10$^{-7}$ |
| Viscosity (cp) at 25° C. | 0.75 | 2.52 | 0.65 | — |
| Dielectric Constant at 20° C. | 2.82 | — | — | — |
| Molecular Weight | 118.13 | 116.12 | 104.10 | 146.19 |
| H$_2$O Content | <10 ppm | <10 ppm | <10 ppm | <10 ppm |
| Electrolytic Conductivity (mS/cm) 20° C. 1M LiAsF$_6$ | 5.00 (1.5 mol) | <3.7 | — | — |

TABLE III

| Carbon Material | BG-35 |
|---|---|
| Surface Area (m$^2$/g) (BET) | 7 |
| Coherence Length L$_c$ (nm) | >1000 |
| Density (g/cm$^3$)[2] | 0.195 |
| Particle Size[1] | <36 |
| Median Size d$_{50}$ (μm) | 17 |
| Interlayer Distance c/2 (nm) | N/A |

[1]Maximum size for at least 90% by weight of graphite particles.
[2]In xylene.

TABLE IV

Properties of KX44

| PROPERTY | | |
|---|---|---|
| Diameter | μm | 9.0 |
| Fiber Density | g/cm$^3$ | 2.23 |
| Surface Area | m$^2$/g | 1.22 |
| Particle Size | | |
| 10% D | μm | 9.3 |
| 50% D | μm | 16.2 |
| 90% D | μm | 51.6 |
| XRD | | |
| d$_{002}$ | nm | 0.3363 |
| Lc$_{002}$ | nm | 52 |
| Ash Content | wt % | 0.01↓ |
| Water Adsorption | wt % | 0.01↓ |

TABLE V

Comparative Specifications of Carbon Materials

| Carbon Material | Surface Area (m²/g, BET) | Coherence Length Lc (nm) | Density (g/cm³) | Particle Size (μm) | Median Size $d_{50}$ (nm) | Interlayer Distance C/2 (nm) |
|---|---|---|---|---|---|---|
| KX 44 | 1.22 | <100 | 2.24 | <70 | 16 | 0.3363 |
| BG 35 | 7 | >1000 | 2.25 | <36 | 17 | n/a |

In summary, the invention solves the problems associated with conventional electrolytes. Solvents containing DMC have always been a problem since DMC readily boils off. EC readily solidifies, and it is necessary for the cell to achieve a temperature of 40° C. to melt the EC and prevent it from solidifying. In addition, mixtures of DMC/EC have been found to result in decomposition evidenced by solution color change and/or by formation of gas. In contrast, solvents of the invention provide highly desirable wide temperature operating range while avoiding decomposition of cell components. It is thought that the solvents of the invention also help overcome problems associated with reactive active materials and avoids the consequences of catalytic reaction which catalyzes decomposition of electrolyte solvent. Therefore, the solvents of the invention are an improvement over conventional solvents.

Based on the performance above, the electrolytes of the invention are considered to be usable with a variety of carbonaceous active materials. This is demonstrated by the better performance of EP/EC/DMC as compared to EP/EC/EMC. The latter is not even operable at low temperatures with a carbonaceous graphite electrode. The carbonaceous materials (carbons) usable with the electrolyte of the invention range from highly structural to amorphous and from powders to fibers. Such materials have well documented physical properties. Some carbons are highly structured, highly crystalline, highly graphitic, anisotropic graphites having a nearly perfect layered structure and preferably formed as synthetic graphites and heat treated up to about 3000° C. Examples are the SFG and the KS graphites as supplied by the manufacturer Lonza G. & T., Limited (Sins, Switzerland). Some carbons are graphitic carbons which have relatively very large crystal size ($L_c$ greater than 2000) and are fully graphitized. BG grades from Superior are purified natural graphite. Some carbons are non-graphitic carbons. These are considered amorphous, non-crystalline, disordered, and are generally petroleum cokes and carbon blacks, as such, supplied by Lonza under the designation FC-250 and Conoco (USA) under the designation XP and X-30.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. An electrochemical cell which comprises a first electrode, a counter electrode which forms an electrochemical couple with said electrode, and an electrolyte; said first electrode comprising particles of carbonaceous intercalation active material; and said electrolyte comprising a solvent mixture and a solute; said solvent mixture comprising ethylene carbonate (EC), propylene carbonate (PC), a compound represented by R'COOR", and dimethyl carbonate (DMC), where R' and R" are each independently selected from the group consisting of ethyl and propyl; and wherein EC/DMC/R'COOR" is in a weight ratio of about 25:40:35 and said PC is present in an amount less than said compound represented by R'COOR".

2. An electrochemical cell which comprises a first electrode, a counter electrode which forms an electrochemical couple with said first electrode, and an electrolyte; said first electrode comprising particles of carbonaceous intercalation active material; and said electrolyte comprising a solvent mixture and a solute; said solvent mixture comprising ethylene carbonate (EC), propylene carbonate (PC), ethyl propionate (EP), and dimethyl carbonate (DMC), wherein said solvent said solvent mixture comprises EC/DMC/EP in a weight ratio of 23:40:35.

3. A lithium ion electrochemical cell which comprises a first electrode, a counter electrode which forms an electrochemical couple with said first electrode, and an electrolyte; each of said electrodes having an intercalation active material, with at least one said active material being a carbonaceous active material; and said electrolyte comprising a solvent mixture and a solute; and solvent mixture comprising ethylene carbonate (EC), propylene carbonate (PC), ethyl propionate (EP), and dimethyl carbonate (DMC), wherein said solvent mixture comprises EC/DMC/EP in a weight ratio of 25:40:35.

* * * * *